United States Patent
Rudas

(10) Patent No.: US 7,960,172 B2
(45) Date of Patent: *Jun. 14, 2011

(54) METHOD AND APPARATUS FOR AERATING ORGANIC WASTE MATERIAL

(75) Inventor: Thomasz Rudas, Bentley (AU)

(73) Assignee: AnaeCo Limited, Bentley (AU)

( * ) Notice: Subject to any disclaimer, the term of this patent is extended or adjusted under 35 U.S.C. 154(b) by 127 days.

This patent is subject to a terminal disclaimer.

(21) Appl. No.: 12/236,252

(22) Filed: Sep. 23, 2008

(65) Prior Publication Data

US 2009/0013741 A1    Jan. 15, 2009

Related U.S. Application Data

(63) Continuation of application No. 10/415,060, filed as application No. PCT/AU01/01372 on Oct. 26, 2001, now Pat. No. 7,651,852.

(30) Foreign Application Priority Data

Oct. 26, 2000  (AU) ...................................... PR1041

(51) Int. Cl.
C12M 1/00    (2006.01)
C12M 3/00    (2006.01)
C12M 1/02    (2006.01)
C05F 11/08   (2006.01)

(52) U.S. Cl. ............... 435/290.1; 435/289.1; 435/290.2; 435/290.3; 435/298.1; 435/298.2; 435/286.6; 71/9; 71/11; 71/12; 71/13; 71/14; 71/15

(58) Field of Classification Search ............... 435/290.1, 435/289.1, 290.2, 290.3, 296.1, 296.2, 286.6; 71/9, 11, 12, 13, 14, 15

See application file for complete search history.

(56) References Cited

U.S. PATENT DOCUMENTS

| | | | |
|---|---|---|---|
| 3,895,916 | A | 7/1975 | Rosner |
| 4,060,390 | A | 11/1977 | Shimizu et al. |
| 4,410,349 | A | 10/1983 | Laurenson, Jr. |
| 5,023,178 | A | 6/1991 | Schiene et al. |
| 5,145,581 | A | 9/1992 | Novy et al. |
| 5,316,905 | A | 5/1994 | Mori et al. |
| 5,457,031 | A | 10/1995 | Masse |
| 5,591,635 | A | 1/1997 | Young et al. |
| 6,065,224 | A | 5/2000 | Eigner |
| 6,399,359 | B1 | 6/2002 | Hofstede |
| 6,699,708 | B1 | 3/2004 | Muller et al. |

FOREIGN PATENT DOCUMENTS

| | | |
|---|---|---|
| DE | 3802499 A1 | 12/1988 |
| EP | 0820425 B1 | 7/2000 |
| FR | 2502639 A | 10/1982 |
| JP | 59042100 A | 3/1984 |
| JP | 09057236 | 3/1997 |
| NL | 8701118 A | 12/1988 |
| NL | 9002891 A | 7/1992 |
| WO | 1997022570 A1 | 6/1997 |

OTHER PUBLICATIONS

Australian Patent Office (ISA/AU), International Search Report for PCT/AU2001/001372, Issued Dec. 24, 2001 Woden Act, Australia.

*Primary Examiner* — Nathan A Bowers

(74) *Attorney, Agent, or Firm* — Duane Morris LLP

(57) ABSTRACT

A method and an apparatus are provided for aeration of organic material, wherein the organic material undergoes an aerobic composing process, such that air is caused to evenly penetrate the organic material. The organic material is first sealed in a vessel. Air is then delivered to the contents of the vessel such that an air pressure of from about 1 to about 1000 kPa above atmospheric pressure is maintained in the vessel. A pressure differential initially forms and is then allowed to equilibrate over a period of time, in which time air flows from areas of high pressure to areas of low pressure in the organic material thus ensuring that aeration is evenly distributed throughout the organic material.

2 Claims, 1 Drawing Sheet

METHOD AND APPARATUS FOR AERATING ORGANIC WASTE MATERIAL

CROSS REFERENCE TO RELATED APPLICATION

This application is a continuation of U.S. Ser. No. 10/415,060, filed Apr. 25, 2003.

FIELD OF THE INVENTION

The present invention relates to a method and apparatus for aeration of organic material, in particular organic waste, animal manure, and biomass that is undergoing an aerobic composting process.

BACKGROUND OF THE INVENTION

Organic material such as biomass, organic waste and animal manure may undergo aerobic composting to convert the organic material to a bioactive stabilised end product that is useful as a soil-conditioner. Aerobic decomposition of organic material results from the metabolic activity of aerobic microbial populations supported on the organic material. An aerobic microbial population requires oxygen to maintain metabolic activity. A constant supply of oxygen or air to the organic material is crucial to maintain optimum microbial activity, thus ensuring rapid biodegradation of organic matter.

There are several known methods by which the organic material can be aerated whilst it is undergoing an aerobic composting process.

Air may be delivered to a volume of organic material contained in a treatment vessel by forced aeration wherein large volumes of air are blown or sucked into the vessel at low pressure. The success of the forced aeration method relies on the organic material having a sufficient degree of porosity to allow air to penetrate the entire volume of the organic material.

In practice, the forced aeration method has several disadvantages, notably as a result of the variable bulk density and porosity of the organic material in the treatment vessel. Air circulates through the organic material and tends to travel a path of least resistance through sections of the material having a low bulk density and high porosity, thereby leaving the sections of material having a high bulk density and low porosity unaerated.

Large volumes of circulating air cool the organic material proximal to regions of high air flow, thereby resulting in an uneven temperature distribution throughout the volume of organic material. Large volumes of circulating air also remove moisture from the material. It has been found that sophisticated odour scrubbing equipment is required to process the circulating air flows and prevent off-site odour impacts. Further, blockage of any of the air delivery points results in little or no air distribution to the material proximal to the blocked air delivery point.

A method known as passive aeration may also be used to deliver air to the organic material for aerobic composting purposes. Organic material is piled in such a manner that the temperature difference between the organic material and the ambient temperature creates a convection current that draws fresh cool air into the pile.

The effectiveness of passive aeration is limited by the size of the pile as material which is located deep inside a large pile does not tend to receive a fresh air supply. Further, the composition of the organic material is restricted to low bulk density materials as high bulk density materials do not have sufficient porosity to allow efficient air flow therethrough. Thus, passive aeration is generally only suitable for low bulk density materials such as shredded tree waste.

Regardless of whether the organic waste material undergoes aerobic decomposition in a treatment vessel or otherwise, the material is typically mechanically agitated or turned at some stage in the composting process to distribute fresh air to the material.

There are a number of disadvantages associated with mechanically agitating or turning the material including the loss of heat and moisture from the material, the liberation of large volumes of volatile nitrogen early in the composting process which reduces the nitrogen content of the final product, and the release of odours from the material.

It is evident that the conventional methods of aeration of organic material do not afford homogenous penetration of the organic material by air whilst the conventional methods frequently result in temperature and humidity inhomogeneities within the organic material.

The present invention attempts to overcome, at least in part, some of the aforementioned disadvantages.

SUMMARY OF THE INVENTION

In accordance with a first aspect of the present invention there is provided a method for aerating organic material undergoing an aerobic composting process, such that air is caused to evenly penetrate the organic material, comprising the steps of:
  (a) sealing the organic material in a vessel;
  (b) delivering air to the contents of the vessel such that an air pressure of from about 1 to about 1000 kPa above atmospheric pressure is maintained in the vessel.

In accordance with a second aspect of the present invention there is provided an apparatus for aerating organic material undergoing an aerobic composting process, such that air is caused to evenly penetrate the organic material, comprising a vessel for receiving the organic material, a means for sealing the vessel, and a means for delivering air to the contents of the vessel such that an air pressure of between about 1 to about 1000 kPa above atmosphere is maintained in the vessel.

BRIEF DESCRIPTION OF THE DRAWINGS

The present invention will now be described, by way of example only, with reference to the accompanying drawings, in which.

DETAILED DESCRIPTION OF THE INVENTION

Figure 1:
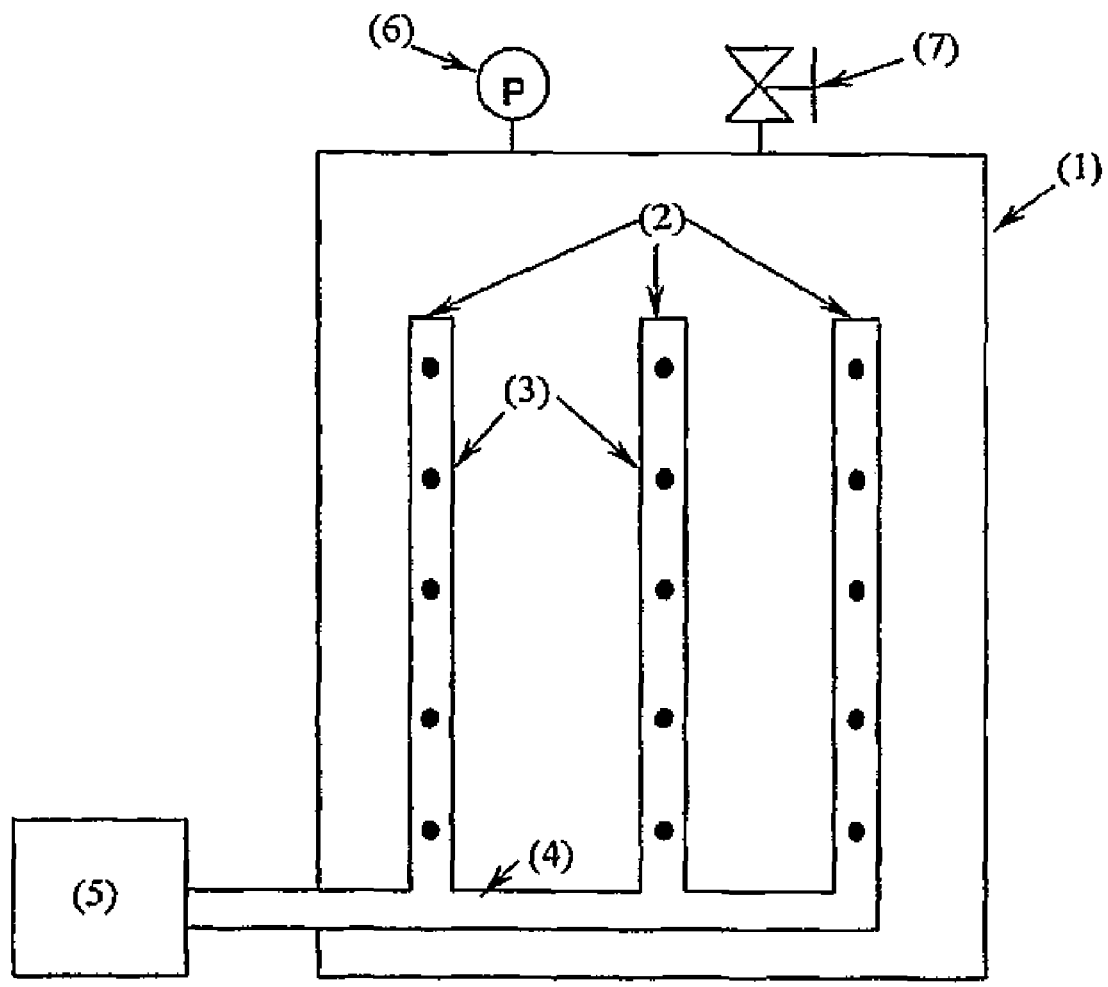
FIG. 1 is a schematic diagram of an apparatus for aerating organic material in accordance with the present invention.

Referring to FIG. 1, there is shown an apparatus 10 for aerating organic material undergoing an aerobic composting process, such that air is caused to evenly penetrate the organic material. The apparatus 10 includes a vessel 1 for receiving the organic material, a means for sealing the vessel 1, and a means for delivering air to the contents of the vessel 1 such that an air pressure of between about 1 to about 1000 kPa above atmospheric pressure is maintained in the vessel 1.

The vessel 1 is an air tight pressurised vessel that is arranged, in use, to house organic waste material. The vessel 1 is constructed from a rigid, chemically inert material with good structural integrity, such as steel or concrete. The vessel 1 is arranged to operate in a pressure range of from 1 to about 1000 kPa above atmospheric pressure. It is also envisaged that the vessel 1 will be arranged to facilitate conditions under which aerobic composting of the contents of the vessel 1 will proceed.

The vessel 1 is provided with means for sealing the vessel 1 in order to maintain an air pressure of from 1 to about 1000 kPa above atmospheric pressure in the vessel 1. The vessel 1 is also provided with an actuated valve 7 that is arranged, in use, to release and reduce air pressure inside the vessel 1.

The means for delivering air to the contents of the vessel 1 includes an air compressor 5, a plurality of conduits 2 extending into an interior of the vessel 1, and a manifold 4 in fluid communication with the air compressor 5 and the conduits 2. The conduits 2 are evenly spaced and distributed throughout the interior of the vessel 1. Each conduit 2 is provided with a plurality of apertures 3 extending along the length of the conduit 2. The manifold 4 facilitates airflow from the air compressor 5 to the conduits 2, and thence into the interior of the vessel 1 through the apertures 3 of the conduits 2.

In an alternative embodiment of the invention the means for delivering air to the contents of the vessel 1 includes an air compressor 5 in fluid communication with at least one inlet port provided in a side of the vessel 1 to facilitate air flow from the air compressor 5 to the interior of the vessel 1.

The vessel 1 is also provided with a means 6 for regulating air pressure within the vessel 1, and a means of measuring oxygen concentration inside the vessel 1, such as an oxygen probe.

The operation of the apparatus 1 and the performance of the method of the present invention will now be described with reference to FIG. 1.

The vessel 1 is loaded with organic material and then completely sealed. It will be understood that the term organic material encompasses biomass, substantially solid organic waste such as municipal waste, animal manures, and a mixture thereof. Typically, the organic material will have been shredded and/or mixed, to afford a mixture with a substantially homogenous porosity and bulk density, prior to it being loaded into the vessel 1. It is also envisaged that the organic material will have been substantially evenly packed or distributed amongst the conduits 2 in the interior of the vessel 1.

Compressed air is supplied to the vessel 1 by the air compressor 5. The compressed air is continuously delivered to the vessel 1 through the apertures 3 of the conduits 2 via the manifold 4 until the air pressure in the vessel 1 is increased to about 1 to about 1000 kPa above atmospheric pressure.

When compressed air is initially supplied to the vessel 1 and an initial air pressure inside the vessel 1 is established, a first local air pressure at any one of the conduits 2 will be greater than a second local air pressure at a location within the organic waste material, resulting in the formation of a pressure differential between any one of the conduits 2 and the location within the organic waste material. Over time, air will flow from areas of higher pressure to those areas of lower pressure to equilibrate pressure within the vessel 1. In this way, air is caused to flow from the conduits 2 or inlet port of the vessel 1 to every void within the organic waste material, thus ensuring even penetration of the organic waste material by air and a continuous supply of oxygen to substantially all microbial populations resident and supported by the organic waste material.

The period of time that is required to achieve pressure equalisation within the vessel, wherein every void within the organic waste material has been completely aerated, is dependent on the bulk density and permeability of the organic waste material. The period of time that is required to achieve pressure equalisation within the vessel 1 can be shortened by increasing the air pressure within the vessel 1 to increase the pressure differential between the conduits 2 and the organic waste material, and so increase the rate of airflow from the conduits 2 to the organic waste material.

The concentration of oxygen in the vessel 1 is monitored either continuously or intermittently by the oxygen probe. When the measured oxygen concentration falls below a predetermined concentration, the actuated valve 7 is opened to release spent air from inside the vessel 1, thus reducing the air pressure inside the vessel 1. Fresh air may then be introduced into the vessel 1 as described previously.

The present invention relies on the principle of airflow from areas of high pressure to areas of low pressure to effect pressure equalisation within the vessel 1. The primary advantage of the present invention is that it ensures that an air supply is delivered evenly throughout the organic waste material contained in the vessel 1. Further, it ensures that there is a substantially even temperature distribution throughout the organic waste material as the metabolic activity of every microbial population is presumed to be operating under optimum conditions. The present invention affords efficient air addition to reduce the volume of waste process air generated and subsequent odour problems.

In comparison to other aeration methods, larger volumes of organic waste material can undergo aerobic composting in the apparatus of the present invention because the means for delivering air to the contents of the vessel causes the air to permeate all of the material in the vessel. Similarly, organic waste material having a very low degree of porosity or highly consolidated organic waste material can undergo aerobic composting in the apparatus of the present invention because the means for delivering air to the contents of the vessel causes the air to permeate all of the material in the vessel. Aerobic composting of organic waste material conducted in conjunction with the method and apparatus of the present invention can thus be successfully performed without the need for mechanical agitation.

Further, means are also provided for precise process control through the regulation of air addition rates and pressures, and the removal of spent air from the vessel prior to addition of oxygen rich air. The present invention also significantly reduces moisture and temperature loss during aeration of the organic waste material, thus creating homogenous conditions for the microbial population within the material without the requirement for additional mechanical agitation or turning and further addition of moisture.

Modifications and variations as would be apparent to a skilled addressee are deemed to be within the scope of the present invention.

What is claimed is:

1. A method for aerating organic material undergoing an aerobic composting process, comprising
   (a) placing the organic material in a rigid pressure-tight vessel which is arranged to be pressurized and sealed and has an interior;
   (b) sealing the vessel;
   (c) delivering compressed air to the interior of the sealed vessel;
   (d) continuing the delivery of compressed air until an air pressure in the vessel is in a range from 1 to 1000 kPa above atmospheric pressure at which point delivery of compressed air is ceased whilst no air is released from the vessel for a period of time;
   (e) allowing air inside the vessel from step (d) to achieve equilibrated pressure inside the vessel so as to ensure even penetration of the organic waste material in the vessel by the compressed air;

(f) measuring the oxygen content of the air contained in the sealed vessel;

(g) maintaining pressure inside the vessel from steps (d) and (e) for a period of time to enable an oxygen content of the air to be reduced by action of microorganisms;

(h) releasing spent air from the vessel when the measured oxygen content falls below a predetermined concentration after step (g) so as to reduce air pressure inside the vessel back to atmospheric pressure; and (i) after step (h) immediately delivering compressed air to the interior of the vessel.

2. The method according to claim 1, wherein the air is delivered into the vessel through a single inlet.

* * * * *